United States Patent [19]

Kessler

[11] Patent Number: 5,249,140
[45] Date of Patent: Sep. 28, 1993

[54] ELECTROHYDRAULIC DISTRIBUTED CONTROL SYSTEM WITH IDENTICAL MASTER AND SLAVE CONTROLLERS

[75] Inventor: James A. Kessler, Troy, Mich.

[73] Assignee: Vickers, Incorporated, Troy, Mich.

[21] Appl. No.: 696,612

[22] Filed: May 7, 1991

[51] Int. Cl.[5] .................. G05B 19/46; G06F 11/30
[52] U.S. Cl. .................. 364/551.01; 364/131; 364/132; 371/9.1
[58] Field of Search .............. 364/551.01, 131, 132; 371/9.1

[56] References Cited

U.S. PATENT DOCUMENTS

| | | | |
|---|---|---|---|
| 4,347,564 | 8/1982 | Sugano et al. | 364/132 |
| 4,700,292 | 10/1987 | Campanini | 395/200 |
| 4,745,744 | 5/1988 | Cherry et al. | 60/368 |
| 4,752,867 | 6/1988 | Backe et al. | 364/132 |
| 4,754,427 | 6/1988 | Okayama | 364/900 |
| 4,814,984 | 3/1989 | Thompson | 395/200 |
| 4,819,149 | 4/1989 | Sanik et al. | 364/132 |
| 5,021,938 | 6/1991 | Hayakawa | 364/132 |
| 5,072,374 | 12/1991 | Sexton et al. | 395/800 |

FOREIGN PATENT DOCUMENTS 62-290903 12/1987 Japan.

Primary Examiner—Jack B. Harvey
Assistant Examiner—Brian M. Buroker
Attorney, Agent, or Firm—Barnes, Kisselle, Raisch, Choate, Whittemore & Hulbert

[57] ABSTRACT

A control module adapted for use as either a master controller or device controller in a distributed electrohydraulic system includes a microprocessor-based control circuit with digital memory having stored therein a plurality of programs for controlling operation of the controller in a variety of applications. A plurality of analog inputs provide a mechanism for connecting sensor signals or the like to input ports of the control microprocessor. A plurality of electrohydraulic valve driver circuits have inputs for receiving valve control signals from the control microprocessor, and outputs for selective connection to electrohydraulic valves coupled to the devices to be controlled. Serial communication circuitry is coupled to the control microprocessor and adapted for connection to a high-speed electrohydraulic bus. A plurality of control routines are prestored in a memory library, as is an executive routine that is employed for operating the microprocessor whether the controller is configured as a master or a device controller. To configure a controller for operation as a master controller or device controller, and to configure the controller for operation in association with a specific type of electrohydraulic device or devices, a selectively programmable and reprogrammable subroutine list coordinates the executive routine with the various control subroutines in the control library for interrelating the analog input signals, the serial communication signals and/or the valve control output signals so as to dedicate operation of the controller as a master controller or as a device controller for a specific type of electrohydraulic device.

3 Claims, 5 Drawing Sheets

ELECTROHYDRAULIC DISTRIBUTED CONTROL SYSTEM WITH IDENTICAL MASTER AND SLAVE CONTROLLERS

The present invention is directed to electrohydraulic systems of the type that include a plurality of electrohydraulic devices coupled to a remote master controller.

BACKGROUND AND OBJECTS OF THE INVENTION

In electrohydraulic systems that include a plurality of electrohydraulic devices, such as actuators, motors and pumps, it has heretofore been proposed to couple each of such devices to an associated device controller, and to connect all of the device controllers to a remote central or master controller for coordinating device operation to perform desired tasks. Motors and actuators may be employed, for example, at several coordinated stages of a machine tool line for automated transfer and machining of parts at a series of work stations. In another typical application, the moving components of an earth excavator may be coupled to electrohydraulic actuators and motors controlled by a master controller responsive to operator lever or joystick inputs.

U.S. Pat. Nos. 4,744,218 and 4,811,561, both assigned to the assignee hereof, disclose distributed control systems that include a plurality of device controllers each dedicated to operation of an associated actuator or pump, and a central or master controller connected to the device controllers by a high-speed bidirectional serial data bus. Internal programming within the master controller establishes a repetitive time sequence of windows for communication in turn with the various device controllers for downloading control signals and parameters, and for uploading data indicative of system status and operation. The various device controllers include internal programming for operating the associated electrohydraulic devices as a function of control signals and parameters received from the master controller. U.S. Pat. Nos. 4,745,744 and 4,757,747, also assigned to the assignee hereof, disclose suitable master and device controller constructions respectively. U.S. application Ser. No. 07/412,211, filed Sep. 25, 1989, now U.S. Pat. No. 5,073,091 likewise assigned to the assignee hereof, discloses a controller suitable for use in association with a hydraulic pump.

Although the overall system and various controllers disclosed in the noted patents and application represent a significant advance in the electrohydraulic system control art, further improvements remain desirable. Specifically, there is a need for a universal controller construction that may be selectively employed as either a master controller or a device controller dedicated to operation of one or more specific electrohydraulic devices, that will provide enhanced flexibility in system design, that will simplify maintenance and repair, and that will reduce manufacturing and inventory costs. A general object of the present invention is to provide such a universal controller construction.

SUMMARY OF THE INVENTION

An electrohydraulic system in accordance with the present invention includes a plurality of electrohydraulic devices responsive to electronic control signals for performing hydraulic operations, at least one individual device controller associated with and dedicated directly to controlling at least one associated electrohydraulic device, and a master controller for generating device command signals and interconnected with the device controllers for coordinating operation of the electrohydraulic devices. The master controller and device controllers each take the form of a microprocessor-based controller that includes digital memory having stored therein a plurality of programs for controlling operation of the controller. A plurality of analog input circuits are connected to the microprocessor-based controller for feeding analog input signals thereto from sensors, for example, responsive to various operating parameters at the device controlled by the controller. A plurality of electrohydraulic valve driver circuits have inputs coupled to the microprocessor-based controller for receiving electrohydraulic valve control signals therefrom, and have outputs for connection to electrohydraulic control valves that control operation of the actuators, motors or other hydraulic devices. The master controller and device controllers are physically identical to each other, and differ from each other only in the way the input and output ports are connected to the external devices, and in the manner in which the control programming stored in the digital memory of each controller is called for executions.

Thus, in accordance with another aspect of the present invention, a control module, adapted for use as either a master controller or device controller in a distributed electrohydraulic control system, includes a microprocessor-based control circuit with digital memory having stored therein a plurality of programs for controlling operation of the controller. A plurality of analog inputs provide a mechanism for connecting sensor signals or the like to input ports of the control microprocessor. A plurality of electrohydraulic valve driver circuits have inputs that receive valve control signals from the control microprocessor, and outputs for selective connection to electrohydraulic valves coupled to the devices to be controlled. Serial communications circuitry is coupled to the control microprocessor and adapted for connection to a high speed electrohydraulic data bus. A plurality of control routines (identical for all controllers) are stored in a memory library, as is an executive routine that is employed for operating the microprocessor whether the controller is configured as a master or device controller. To configure a controller for operation as a master controller or a device controller, and to configure a device controller for operation in association with a specific type of electrohydraulic device or devices, a selectively programmable and reprogrammable subroutine list coordinates the executive routine with the various control subroutines in the control library. The subroutine list cooperates with the fixed programming routines to interrelate the analog input signals, the serial communication signals and/or the valve control output signals so as to dedicate operation of the controller as a master controller or as a device controller for a specific type of electrohydraulic device.

BRIEF DESCRIPTION OF THE DRAWINGS

The invention, together with additional objects, features and advantages thereof, will be best understood from the following description, the appended claims and the accompanying drawings in which:

DETAILED DESCRIPTION OF PREFERRED EMBODIMENTS

Figure 1:
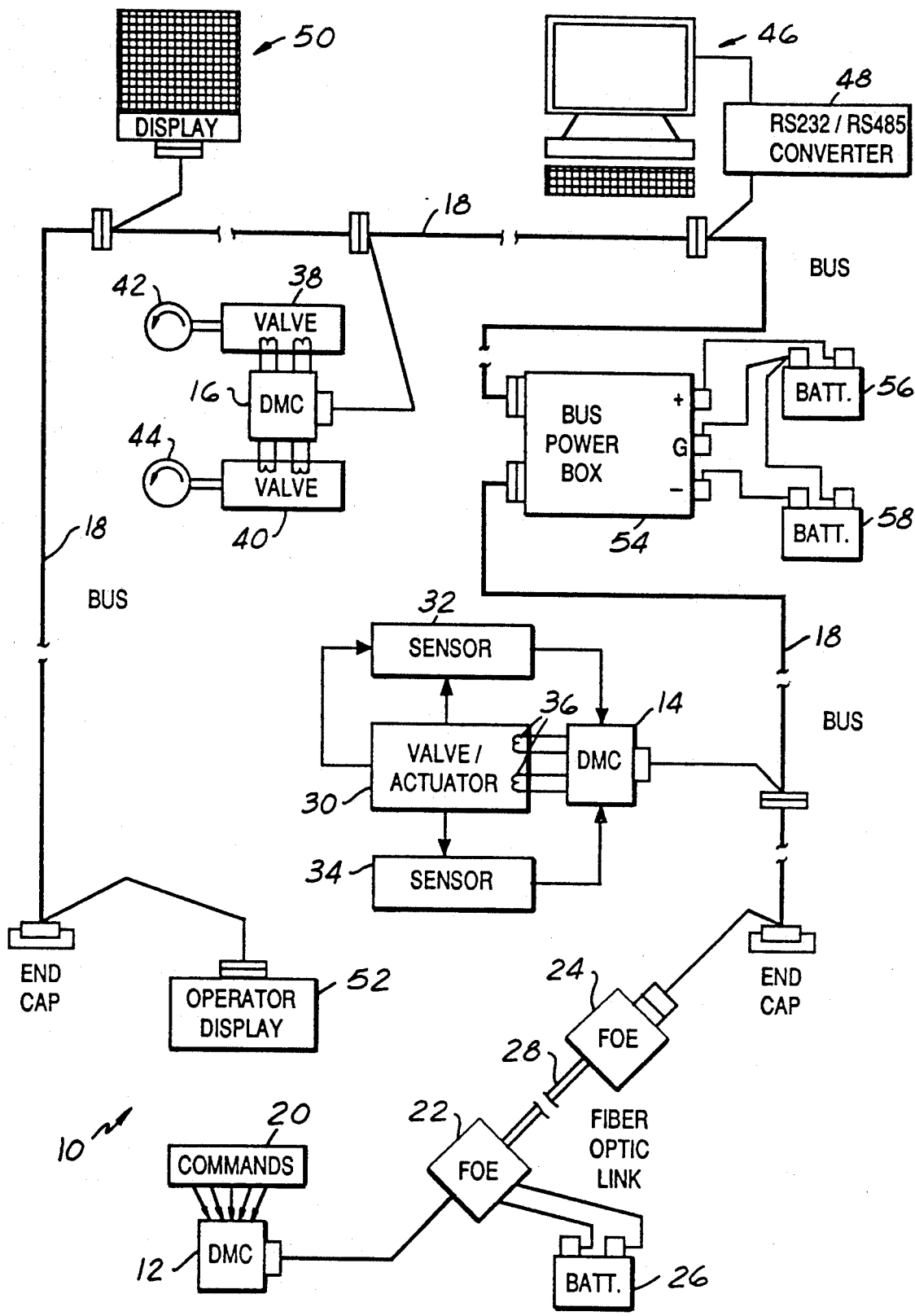
FIG. 1 is a functional block diagram of an electrohydraulic system in accordance with an exemplary implementation of the present invention.

FIG. 1 illustrates an electrohydraulic system 10 as comprising a plurality of digital mobile controllers (DMS's) 12,14,16 interconnected by a serial communication bus 18. Controller 12 is configured as a master controller and receives operator commands 20 from operator switches, joysticks or the like. Controller 12 is connected to bus 18 by a pair of fiber optic extenders 22,24. Such interconnection and the fiber optic extenders are illustrated in U.S. Pat. No. 4,917,213, assigned to the assignee hereof. A battery 26 provides power for controller 12, which is isolated from the power lines of bus 18 by the fiber optic interconnection 26 between extenders 22,24.

Controller 14 is dedicated to operation of a servo valve/actuator combination 30. Controller 14 receives command signals from controller 12 through bus 18, and receives analog signals from a pair of sensors 32,34 responsive to operation at the servo valve and actuator respectively. Controller 14 provides valve control signals to the coils 36 of the servo valve as a function of the command signals from the master controller and the return signals from sensors 32,34. In general, operation of controller 14, in association with valve/actuator 30 and sensors 32,34, is discussed in detail in aforementioned U.S. Pat. No. 4,757,747.

Controller 16 is illustrated as configured for open-loop operation of a pair of electrohydraulic valves 38,40, which respectively control operation of a pair of hydraulic motors 42,44. Controller 16 receives command signals from bus 18, and returns information indicative of operation to master controller 12. U.S. Pat. No. 4,744,218 illustrate control schemes for operation in an open loop mode. The microprocessor-based control circuitry of controllers 12-14 (to be described) may be programmed by a personal computer 46 selectively connected to bus 18 by an RS232/RS485 convertor 48, and/or by a hand-held programming device 50 suitable for "fine tuning" system operation and/or selective variation during operation of various control parameters. An operator display 52 is connected to bus 18 for providing management and/or control information to an operator. System electrical power is provided through bus 18 by a bus power system 54, which receives primary or back-up power from a pair of batteries 56,58.

Figure 2A:
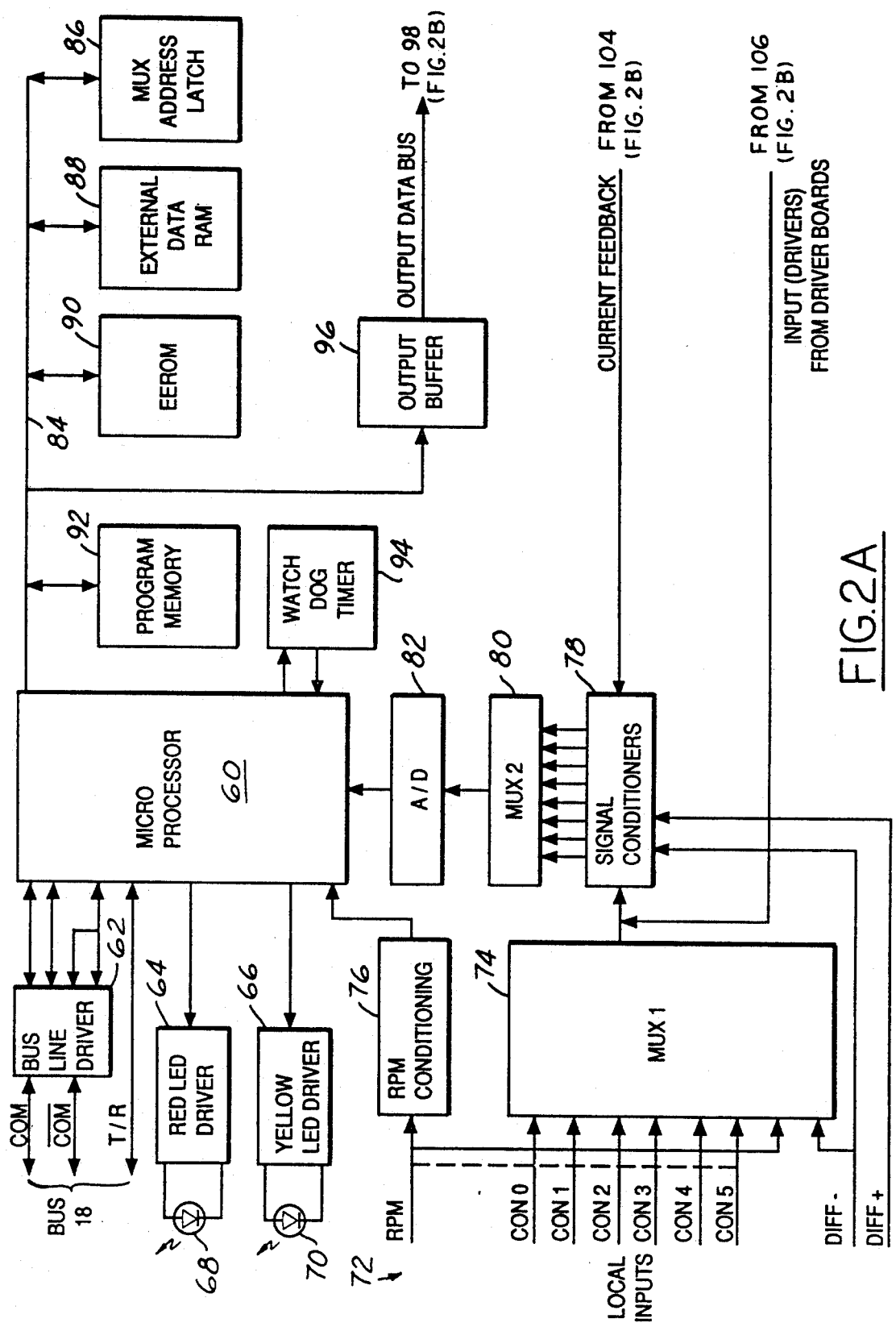
FIG. 2A is a functional block diagram of the microprocessor, analog I/O and serial I/O circuitry in the DMC controllers illustrated in FIG. 1.
Figure 2B:
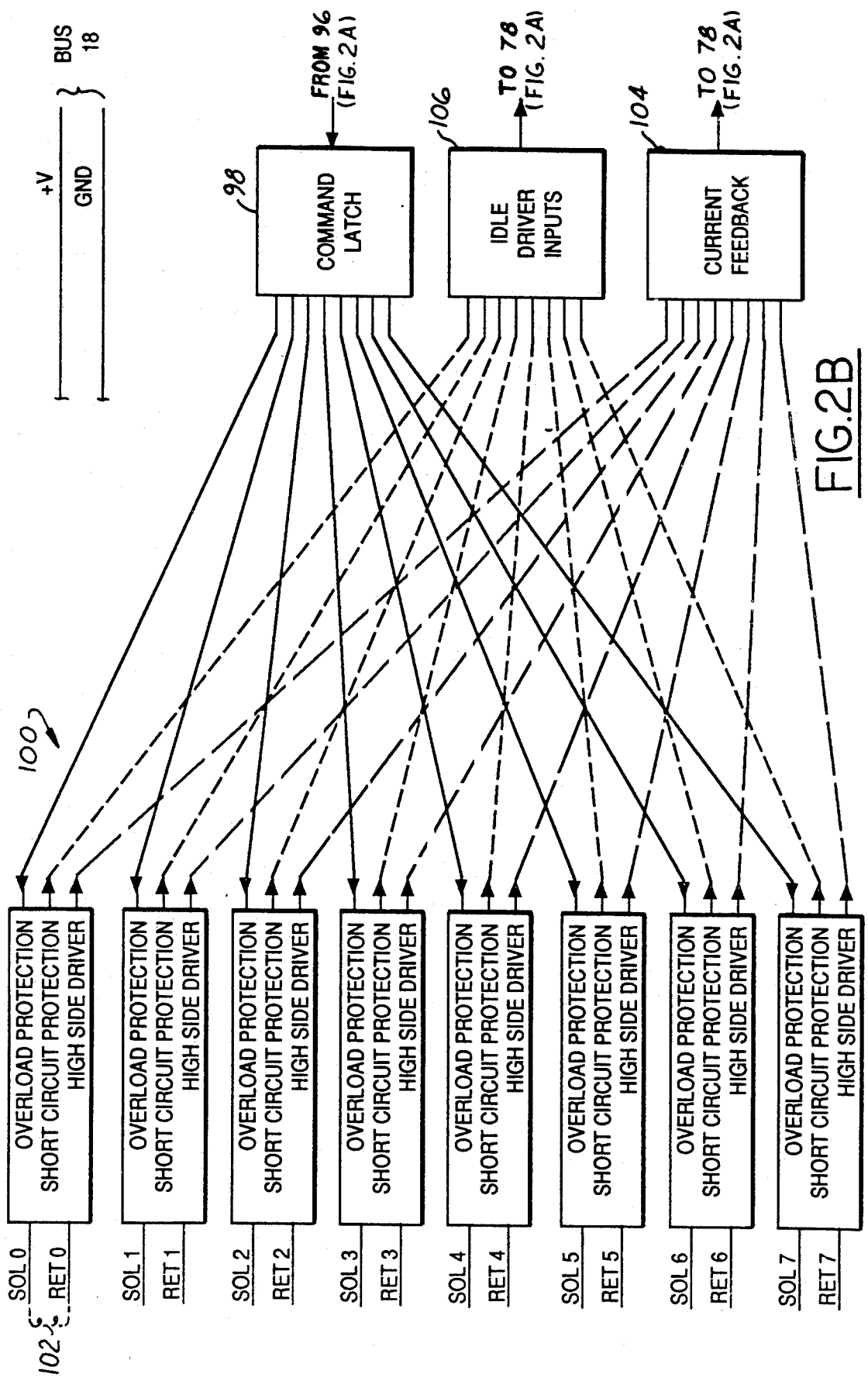
FIG. 2B is a functional block diagram of the valve driver portion of the circuitry in the DMC controllers illustrated in FIG. 1.

FIGS. 2A and 2B illustrate the circuitry of controllers 12,14,16, such circuitry hardware being identical in accordance with the distinguishing feature of the present invention, and the various controllers being dedicated to their specific functions by means of interconnection of the I/O ports with the various external devices (e.g., operator command generator 20, valves and sensors 30-34. and valves 38-40), and by means of the control program execution list or EXECLIST (FIG. 4) stored in memory. A microprocessor 60 has input, output and control ports connected through a bus line driver 62 to the COM,/COM and T/R conductors of bus 18. Microprocessor 60 is also connected through a pair of drivers 64,66 to a pair of LED's 68,70 for indicating pendancy of communication via bus 18 and/or pendancy of other operations at the controller.

Eight analog input lines provide for input of analog signals to microprocessor 60. Six input lines CON-0-CON5, and a seventh line DIF−, are connected as inputs to a multiplexer 74. An RPM line is connected as an input to conditioning circuitry 76 for direct feed to microprocessor 60, and as an input to multiplexer 74 for added versatility where the controller is not employed in conjunction with a device (such as a pump or motor) that provides a digital RPM sensor signal. The eighth analog input line labeled DIF+ is connected, along with the DIF− input, to signal conditioning circuitry 78. Thus, the control microprocessor can receive an input signal from a sensor, such as an RPM sensor, that provides a digital sensor signal, inputs from analog sensors or controls such as joysticks, variable resistance position sensors, LVDT's or the like, and a differential input from sensors or the like that provide output of that character. Multiplexer 74 is connected through signal conditioning circuitry 78, a second multiplexer 80 and an a/d convertor 82 to an input port of microprocessor 60.

Microprocessor 60 is connected by a data/address bus 84 to a memory address latch 86, to a data RAM 88, to a non-volatile electronically erasable read-only-memory (EEPROM) 90, and to a program memory 92. RAM 88 is used as a scratch-pad memory during operation of microprocessor 60. Program memory 92, which preferably comprises a programmable read-only-memory (PROM), has prestored therein an executive routine for operation of microprocessor 60, and a library that includes a plurality of control subroutines for various specific operations, such as pulse width modulation of electrohydraulic valves, control algorithms for generating valve control signals as a function of the, input command and sensor feedback signals, etc. Various valve and/or pump control algorithms are disclosed in the U.S. patents and application referenced above. EEPROM 90 has selectively and variably stored therein control information that relates the executive routine, common to all controllers, and the various control subroutines, likewise common to all controllers, for dedicated operation of the controller in the specific application for which it is intended. A watchdog timer 94 monitors operation of microprocessor 60 and automatically resets the microprocessor in the case of malfunction.

Microprocessor 60 is also connected by bus 84 to an output buffer 96, which feeds valve control signals to a command latch 98 (FIG. 2B). Outputs from command latch 98 are connected to each of eight valve driver circuits 100. Each valve driver circuit has an output and return line SOL and RET adapted for connection to a valve coil 102 to energize the valve coil and provide a return signal indicating that current has been applied to the valve coil. Such return signals from drivers 100 are fed through current feedback circuit 104 (FIG. 2B) to signal conditioning circuitry 78 (FIG. 2A) for input to microprocessor 60. Circuit details of valve drivers 100 are similar to those illustrated in above-referenced U.S. Pat. No. 5,073,091. A feature of the valve driver circuits is that they may be employed as analog input circuits when the circuit is not to be used for operating a servo valve. For this purpose, each circuit 100 is also connected through a multiplexer 106 to signal conditioner 78 (FIG. 2A). Power for operation of the controller is obtained from bus 18.

Figure 3:
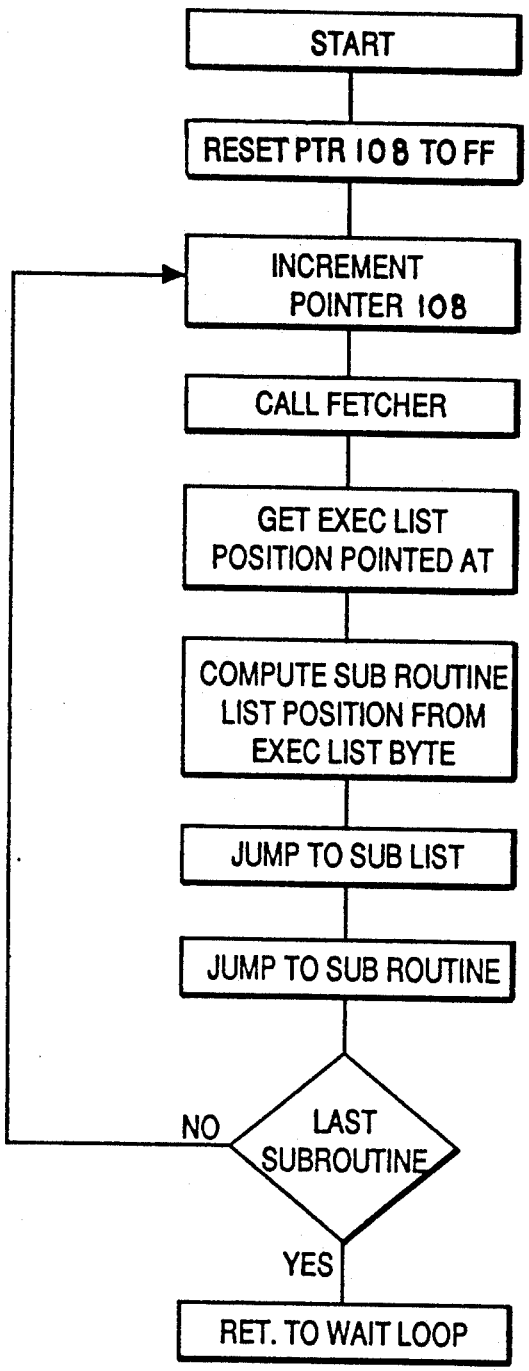
FIG. 3 is a flow chart that illustrates operation of the executive routine executed in each of the DMC controllers of FIG. 1.
Figure 4:
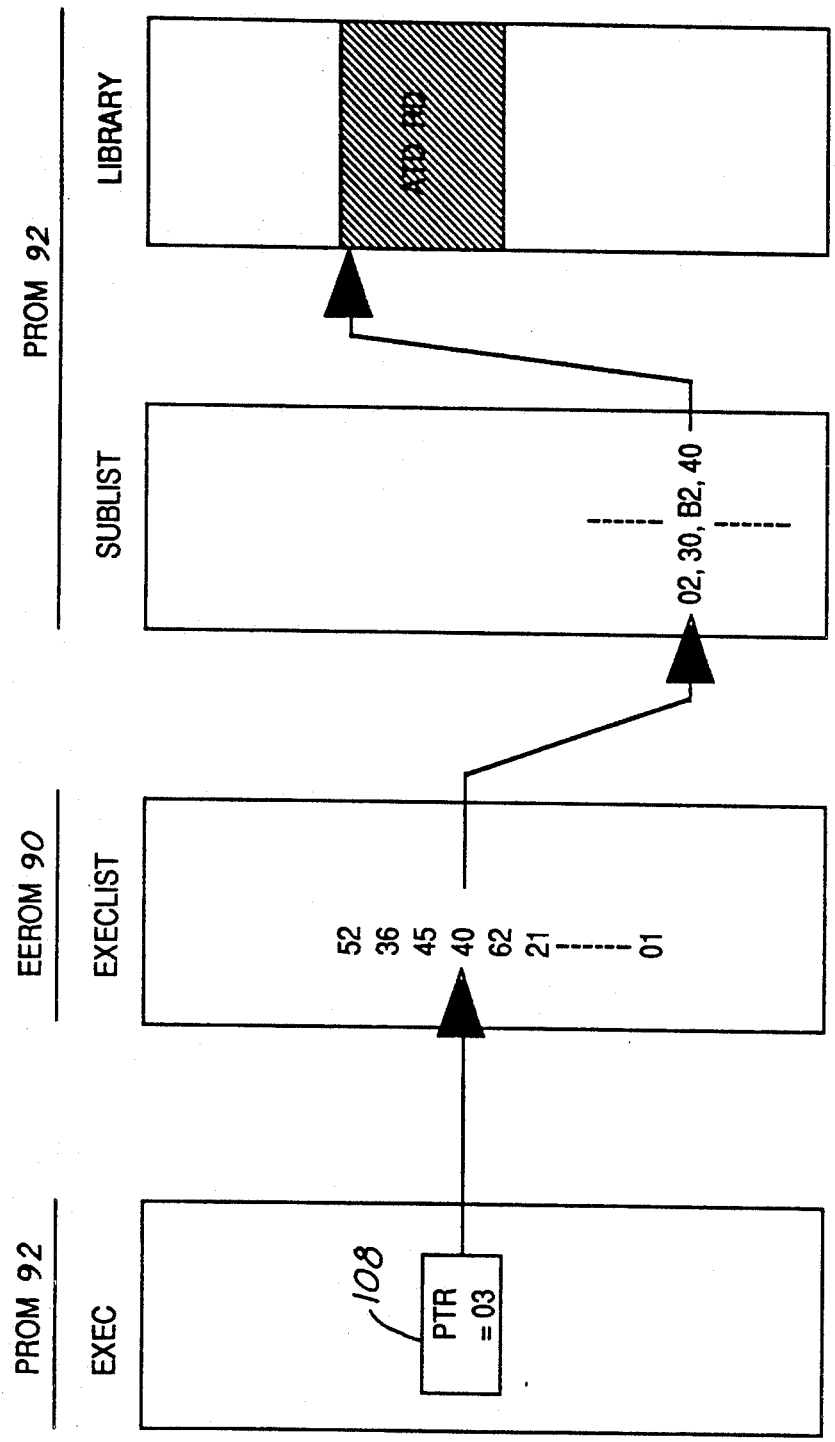
FIG. 4 is a graphic illustration of operation of the executive routine in each DMC controller.

FIGS. 3-4 illustrate operation of the programming for the controller. FIG. 3 is a flow chart that illustrates operation of the EXECutive routine for calling sequential control subroutines, and FIG. 4 illustrates the manner in which the EXECutive routine is coordinated with the library of control subroutines in dedicating each controller through programming of the EXECLIST. Upon initiation of the EXECutive routine (FIG. 3), the EXECLIST pointer 108 (FIGS. 3 and 4) is first reset to hex FF. Pointer 108 is then incremented upon each pass through the EXEC routine, first to 00, next to 01, etc. At each increment of pointer 108, the EXECLIST stored in EEPROM 90 is accessed. The EXECLIST consists of an index of subroutines in the order in which the subroutines are to be executed during operation. For example, when pointer 108 is at a value of 03 (on the third pass through the EXECutive routine), the EXECLIST indicates that subroutine 40 is to be executed. This subroutine code is then employed to obtain corresponding library address information for the PROM SUBLIST, which in turn identifies a specific section of the PROM LIBRARY containing the desired control subroutine. The index stored in the EXECLIST consists of the number or other identification of the desired subroutines to be executed in the order to be executed. The identification of all subroutines resident in the LIBRARY of PROM 92 is contained in a library SUBLIST.

Thus, it is the EXECLIST index in EEPROM 90 that effectively dedicates the controller to a specific application. The subroutines listed in the EXECLIST index are executed in the order defined by this index list upon each increment of pointer 108 until EXECLIST index 01 is encountered. When the EXECLIST index of 01 is encountered, this indicates execution of the last subroutine for that particular cycle through the EXECutive routine, and operation enters a wait period for reinitiation of the EXECutive routine.

To configure a system (FIG. 1), controllers 12–16 are first connected to bus 18. At this point, the EXECLIST of each controller is empty, but PROM 92 is fully programmed, including the executive routine SUBLIST and program LIBRARY. The system designer then connects PC46 and convertor 48, or hand-held programming device 50, to bus 18, and addresses each controller 12–16 in turn. As each controller is addressed, the system designer downloads into controller EEPROM 90 the EXECLIST for that particular controller's dedicated configuration, together with the required operating parameters, such as valve or servo loop gains, etc. for the specific application to which the controller is dedicated. When this process is completed for all controllers, system operation is initiated.

Control subroutines vary with valve type and applications, control algorithms, etc. A number of control algorithms are disclosed in the several patents identified above. Other routines for setting parameters, sampling inputs, computing and communicating data, etc. may be employed. Again, several typical algorithms are disclosed in the noted patents. Programming details are readily derivable by persons in the art, and do not per se form part of the present invention.

The invention thus described therefore obtains the objects and aims previously set forth. Specifically, a single controller construction may be employed for both master and dedicated controller functions. The controller accepts up to eight analog input signals, one of which can alternatively function as a digital input for RPM measurement or the like, and another of which can operate as a differential signal input. The controller can drive up to eight flow control valves with pulse width modulated drive signals. Any coil driver that is not required can be used as a supplemental analog input. Thus, in the case of a master controller application for example where the controller does not operate any valve coils, up to sixteen analog inputs can be accommodated. The controller includes a large program memory library common to a number of applications, and facility for selecting specific routines from the LIBRARY for a specific dedicated application.

The disclosures of aforementioned U.S. patents and application are incorporated herein by reference for purposes of background information.

I claim:

1. An electrohydraulic system with distributed control that includes a plurality of electrohydraulic devices responsive to electronic control signals for performing hydraulic operations and control means for providing said control signals, said control means including at least one individual device control means associated with and dedicated directly to controlling at least one associated electrohydraulic device, master control means for generating device command signals and means coupling said master control means to all of said device control means for coordinating operation of said electrohydraulic devices, characterized in that said master control means and said at least one device control means each comprise:
    a microprocessor-based controller including digital memory having prestored therein a plurality of programs for controlling operation of said controller and the associated said control means,
    a plurality of analog input means and means for connecting said analog input means to said controller for feeding analog input signals thereto,
    a plurality of electrohydraulic valve driver circuits having inputs for receiving valve control signals from said controller and output means for connection to electrohydraulic control valves coupled to said devices, and
    serial communication means coupled to said controller,
    said means coupling said master and device control means comprising a serial communication bus interconnecting said serial communication means of all of said control means,
    said master control means and said at least one device control means being physically identical and differing from each other in control programming stored in said controller memory for selecting among said plurality of programs.

2. The system set forth in claim 1 wherein said control programming stored in said memory includes an executive control routine identical in all of said master and device control means, a library of control routines identical in all of said master and device control means, and means unique to each said device control means foe executing at least some of said control routines responsive to operation of said executive routine in each said control means for dedicating each said control means to an associated control function.

3. For use in an electrohydraulic system with distributed control that includes a plurality of electrohydraulic devices responsive to electronic control signals for performing hydraulic operations, at least one device control means associated with and directly controlling operation of at least one said electrohydraulic device, master control means for generating device command signals, and a bidirectional serial bus coupling said master control means to said device control means for serial intercommunication to coordinate operation among said electrohydraulic devices, a control module for use as said master control means or any one of said at least one device control means comprising:

a microprocessor-based controller including digital memory means having prestored therein a library of programs for controlling operation of said controller, a plurality of analog input means and means for connecting said analog input means to said controller for feeding analog input signals thereto, a plurality of electrohydraulic valve driver circuits having inputs for receiving valve control signals from said controller and output means for connection to electrohydraulic valves coupled to said devices, and serial communication means coupled to said controller for connection to said bus, said memory means including at least a first portion for storing a fixed executive routine, a second portion for storing said library of control routines that interrelate said analog input signals, said serial communication and said valve control signals, and a third portion of selectively and reprogrammably storing a routine for coordinating said executive routine with said library control routines so as to dedicate operation of said controller to one of said control means.

* * * * *